US010137412B2

(12) United States Patent
Sumiya

(10) Patent No.: US 10,137,412 B2
(45) Date of Patent: Nov. 27, 2018

(54) FILTER

(71) Applicant: Johnson Matthey Public Limited Company, London (GB)

(72) Inventor: Satoshi Sumiya, Sakura (JP)

(73) Assignee: Johnson Matthey Japan G.K., Sakura-shi, Tochigi (JP)

( * ) Notice: Subject to any disclaimer, the term of this patent is extended or adjusted under 35 U.S.C. 154(b) by 0 days.

(21) Appl. No.: 15/324,278

(22) PCT Filed: Jan. 7, 2016

(86) PCT No.: PCT/JP2016/050353
§ 371 (c)(1),
(2) Date: Jan. 6, 2017

(87) PCT Pub. No.: WO2017/119101
PCT Pub. Date: Jul. 13, 2017

(65) Prior Publication Data
US 2018/0028973 A1 Feb. 1, 2018

(51) Int. Cl.
*B01D 53/94* (2006.01)
(52) U.S. Cl.
CPC ...... *B01D 53/944* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/908* (2013.01); *B01D 2255/9155* (2013.01)

(58) Field of Classification Search
CPC .............. F01N 3/2828; B01D 53/9472; B01D 53/9477; B01D 2255/1021
USPC ................................................... 422/177, 180
See application file for complete search history.

(56) References Cited

U.S. PATENT DOCUMENTS

| | | | | |
|---|---|---|---|---|
| 2014/0086805 A1* | 3/2014 | Sugimoto | ............... | B01J 35/04 422/180 |
| 2014/0356266 A1* | 12/2014 | Chen | .................. | B01D 53/9472 423/212 |
| 2015/0202572 A1* | 7/2015 | Chiffey | .................... | B01J 23/66 423/213.5 |
| 2016/0067653 A1* | 3/2016 | Miyairi | ................ | B01D 53/945 422/180 |

FOREIGN PATENT DOCUMENTS

| | | | |
|---|---|---|---|
| EP | 3162428 A1 | | 5/2017 |
| JP | 2003154223 A | * | 5/2003 |
| JP | 2009106926 A | | 5/2009 |
| JP | 2009112907 A | | 5/2009 |
| JP | 2010069471 A | | 4/2010 |

(Continued)

*Primary Examiner* — Tom P Duong
(74) *Attorney, Agent, or Firm* — Gary D. Mangels

(57) ABSTRACT

The present invention provides a filter comprising a base material and a catalytic substance provided within the base material, wherein the base material comprises a plurality of cells forming gas flow paths and having a gas inflow-side end portion and outflow-side end portion, and a plurality of porous partition walls defining said cells, the end portions of at least some of the cells being closed off, and the void occupancy of the catalytic substance within the pores of the partition walls is 10% or less.

9 Claims, 4 Drawing Sheets

(56) References Cited

FOREIGN PATENT DOCUMENTS

| JP | 2010264359 A | 11/2010 |
|---|---|---|
| JP | 2013510702 A | 3/2013 |
| JP | 2014069183 A | 4/2014 |
| JP | 2014094360 A | 5/2014 |
| JP | 2015077532 A | 4/2015 |

* cited by examiner

[Fig. 1]
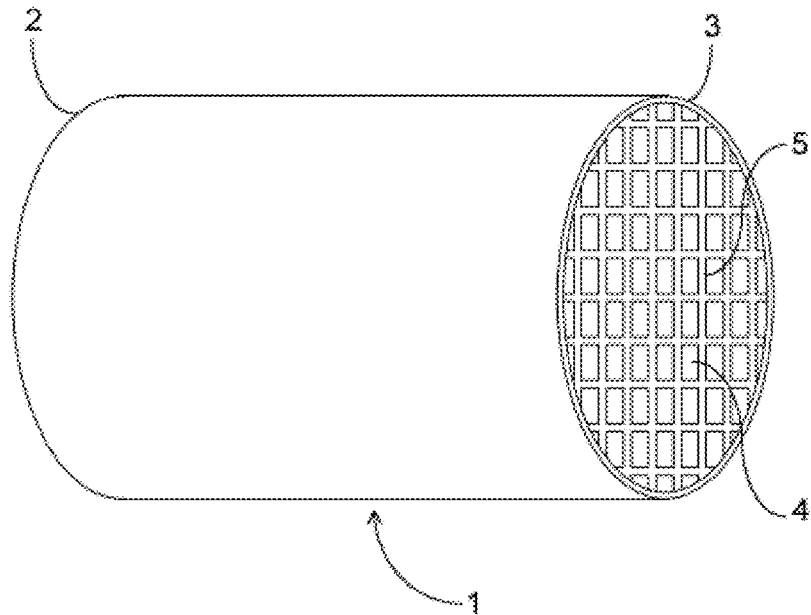
[Fig. 2]
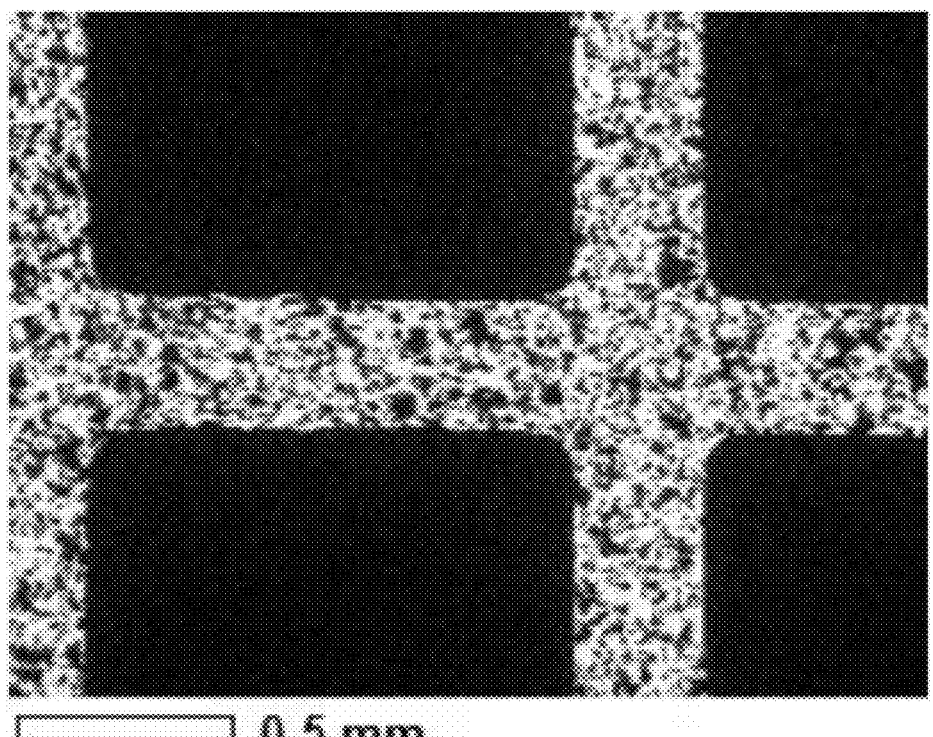

[Fig. 3]
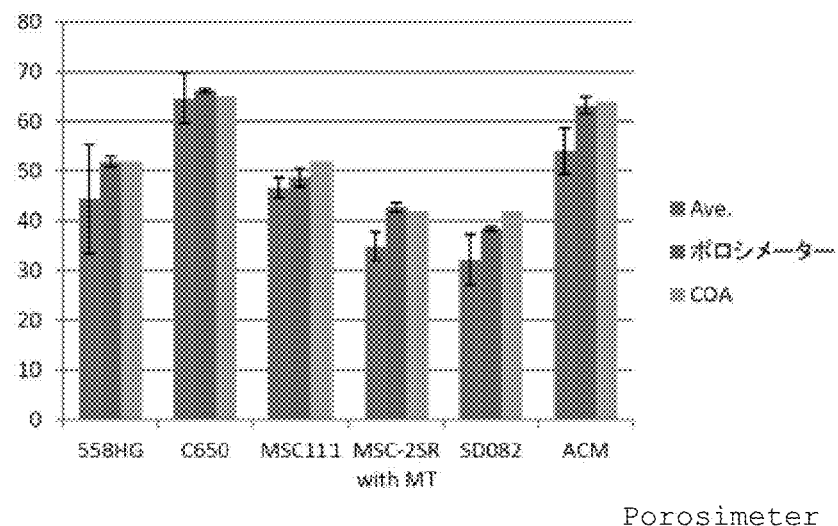
[Fig. 4]
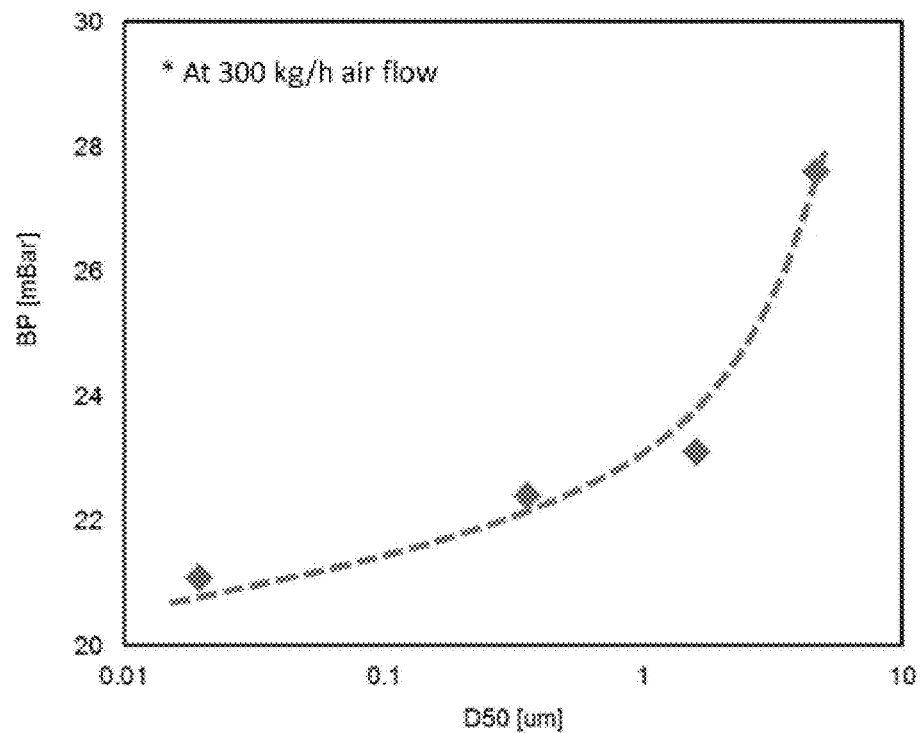

[Fig. 5]
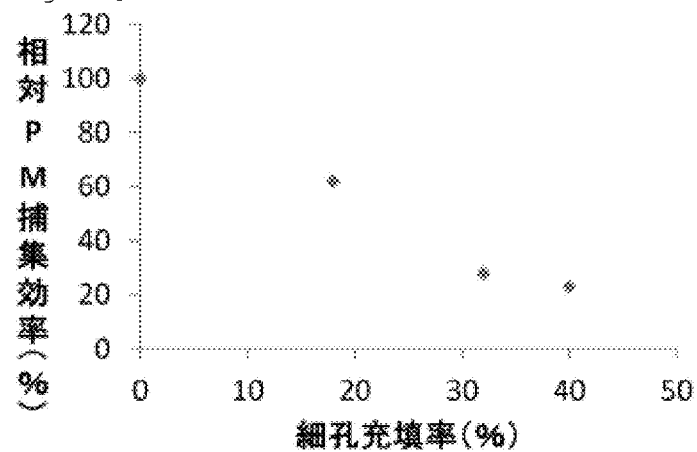
↑ Relative PM trapping efficiency (%)
→ Pore filling ratio (%)
[Fig. 6]
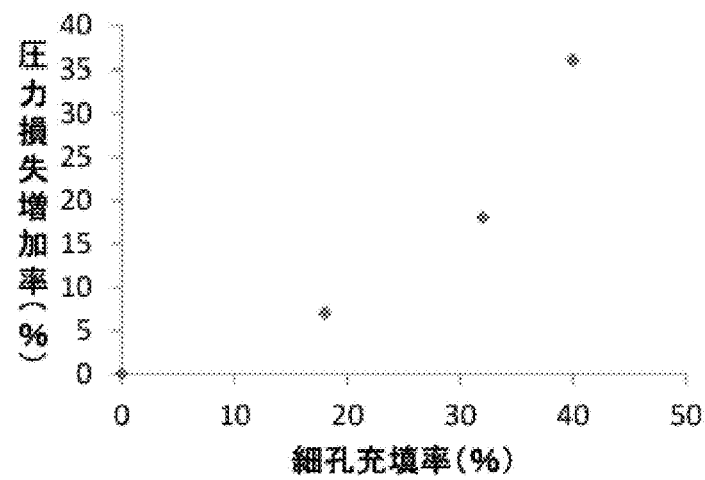
↑ Pressure loss increase rate (%)
→ Pore filling ratio (%)

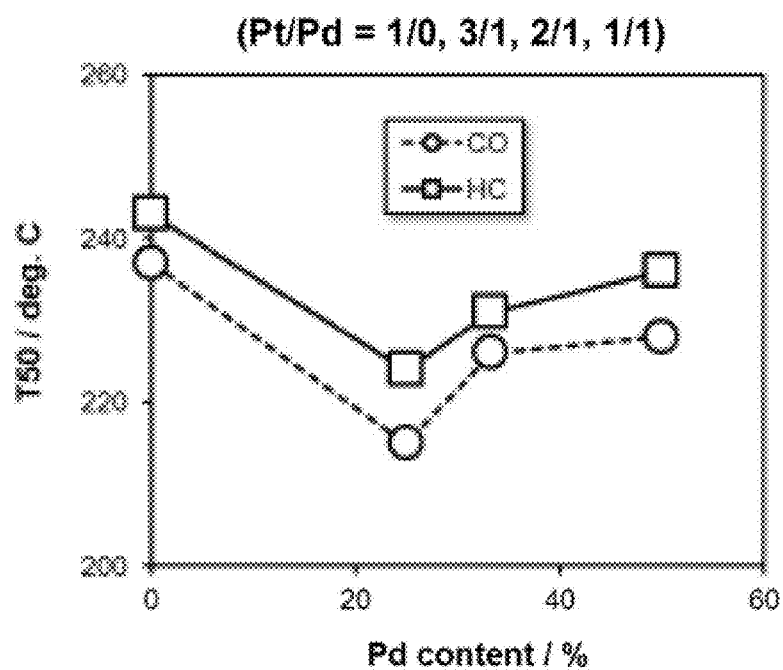
[Fig. 7]

FILTER

CROSS-REFERENCE TO RELATED APPLICATIONS

This national stage application claims priority benefit of International (PCT) Application No. PCT/JP2016/50353, filed on Jan. 7, 2016, and is incorporated herein by reference.

TECHNICAL FIELD

The present invention relates to a filter.

PRIOR ART

A filter of the type in which end portions of cells forming gas flow paths are alternately closed off and gas passes through partition walls in the cells has been proposed in the prior art as a filter forming part of an exhaust gas purification system (wall-flow filter). A filter of this type has a structure in which gas flowing into the filter from the engine side is made to forcibly pass through voids in the partition walls.

Meanwhile, there are also filters of the type in which the end portions of the cells are not completely closed off alternately and by necessity the total amount of gas does not pass through the partition walls. A filter of this type has a relatively low trapping efficiency in respect of PM (particulate matter including graphite etc.) in comparison with the abovementioned wall-flow filter, but because it has a structure that is unlikely to become completely clogged, there is an advantage in that forced regeneration control is unnecessary as a matter of course.

SUMMARY OF THE INVENTION

The inventors of the present invention found that there is a reduction in the amount of PM which can be trapped inside the cell in the case of an on-wall catalyst coating method in which the surfaces of partition walls of filter cells are charged with a catalytic substance in a wall-flow type filter in which the end portions of the cell are alternately closed off, so there is a problem in terms of a reduced PM trapping efficiency.

Meanwhile, it was found that the porosity of the partition walls decreases if there is an excessive amount of coating in the case of an in-wall type filter when the catalytic substance is simply coated on the inside of the porous partition walls, so there is a reduction in PM trapping efficiency and furthermore, there is also a reduction in PM oxidation efficiency afforded by the catalyst.

The present invention has been devised against this background, and the aim thereof lies in providing a filter which does not suffer any loss in terms of performance relating to PM trapping efficiency, and which can also maintain high treatment efficiency afforded by the catalyst.

The present invention provides a filter comprising a base material and a catalytic substance provided within the base material, wherein the base material comprises a plurality of cells forming gas flow paths and having a gas inflow-side end portion and outflow-side end portion, and a plurality of porous partition walls defining said cells, the end portions of at least some of the cells being closed off, and the void occupancy of the catalytic substance within the pores of the partition walls is 10% or less.

According to a mode of the present invention, the abovementioned filter is such that the catalytic substance has a mean particle size D50 of $\frac{1}{10}$ or less of the mean pore size D50 of the pores in the partition walls.

According to a mode of the present invention, the abovementioned filter is such that the concentration ratio of noble metals contained in the catalytic substance at the gas inflow-side end portion and outflow-side end portion is between 10/90 and 90/10.

According to a mode of the present invention, the abovementioned filter is such that the catalytic substance is included in a range of between 10% and 50% of the total length of the partition walls in the lengthwise direction, from the gas inflow-side end portion.

According to a mode of the present invention, when Pt and Pd are used as the catalytic substance, the abovementioned filter comprises said materials in a ratio of between 1:1 and 10:1.

According to a mode of the present invention, the abovementioned filter includes at least one material selected from the group consisting of oxygen storage materials, alkali metals and perovskite materials.

According to a mode of the present invention, the abovementioned filter is such that only one of the gas inflow-side end portion and outflow-side end portion is partially closed off.

According to a mode of the present invention, the abovementioned filter is such that the porosity of the base material is between 40% and 70%.

According to a mode of the present invention, the abovementioned filter is such that the void occupancy of the catalytic substance is less than 5%.

The present invention makes it possible to provide a filter which does not suffer any loss in terms of performance relating to PM trapping efficiency, and which can also maintain high treatment efficiency afforded by the catalyst.

BRIEF DESCRIPTION OF THE DRAWINGS

FIG. 1 is a schematic diagram to illustrate the filter according to a mode of embodiment;

FIG. 2 is an image of the filter as observed under an electron microscope;

FIG. 3 is a graph showing the correlation of void occupancy obtained from an SEM image and void occupancy obtained from measurement results using a mercury porosimeter;

FIG. 4 is a graph showing the relationship of catalyst particle size and pressure loss;

FIG. 5 is a graph showing the relationship of PM trapping efficiency and pore filling ratio in a CSF;

FIG. 6 is a graph showing the relationship of pressure loss increase rate and pore filling ratio in a CSF; and FIG. 7 is a graph showing the relationship of Pt/Pd ratio and combustion temperature.

MODE OF EMBODIMENT OF THE INVENTION

A mode of embodiment of the present invention will be described below with the aid of the drawings but the present invention is obviously not limited by this mode of embodiment.

[Filter]

The filter according to this mode of embodiment comprises a base material 1 and a catalytic substance provided within the base material 1, said filter being characterized in that the base material 1 comprises a plurality of cells 4 forming gas flow paths and having a gas inflow-side end portion 2 and outflow-side end portion 3, and a plurality of porous partition walls 5 defining said cells 4, the end portions of at least some of the cells 4 being closed off, and the void occupancy of the catalytic substance (not depicted) within the pores (not depicted) of the partition walls is 10% or less.

The filter according to this mode of embodiment does not suffer any loss in terms of performance relating to PM trapping efficiency, and can also maintain high treatment efficiency afforded by the catalyst.

As illustrated in FIG. 1, the filter according to this mode of embodiment comprises the base material 1 and the catalytic substance provided within the base material. The base material 1 supports the catalytic substance and is preferably durable, without reducing the combustion efficiency of a connected engine.

There is no particular limitation as to the material forming the base material 1, provided that pores are provided at least in the partition walls 5, but when the filter is utilized as an exhaust gas purification filter, for example, a porous ceramic material is preferably used.

Preferred materials for the base material 1 include: cordierite ceramics comprising three components, namely aluminum oxide ($Al_2O_3$:alumina), silicon dioxide ($SiO_2$: silica) and magnesium oxide (MgO); silicon carbide and aluminum titanate. By using these materials with an organic pore-forming material, it is possible to set the porosity of the partition walls 5 etc. in the base material 1 in a preferred range.

A honeycomb-shape comprising these materials is preferred as the base material 1. A honeycomb filter comprises a plurality of cells forming gas flow paths, but there is no particular limitation as to the cross-sectional shape of the cells and a "chessboard" grid such as that illustrated in FIG. 1 may be used or hexagonal shapes may be used, for example, and there are no particular constraints on the shape thereof. Alternatively, it is equally possible to use what is known as an asymmetric cell structure having different cell sizes at the inlet and the outlet.

There is no limitation as to the structure of the base material 1 in the filter according to this mode of embodiment, but the base material 1 comprises at least the gas inflow-side end portion 2 and outflow-side end portion 3. Furthermore, the base material 1 comprises at least the plurality of cells 4 that form the gas flow paths and the plurality of porous partition walls 5 that define said cells 4.

In the filter according to this mode of embodiment, the plurality of cells 4 are such that the end portions of at least some of said cells 4 are closed off. By virtue of this kind of structure, gas flowing in from the inflow-side end portion 2 flows out from the outflow-side end portion 3, with some of the gas moving inside the cells 4 without passing through the partition walls, and some of the gas passing through the pores in the partition walls 5.

There is no limitation as to the proportion of closed-off cells, nor is there any limitation as the arrangement of the closed-off cells. The filter according to this mode of embodiment more preferably employs a base material having a configuration such as that described above, but there is no limitation as to the configuration of the base material supporting the catalytic substance.

The catalytic substance is supported and held on the surface of the base material 1, said catalytic substance comprising an active metal, an active metal support and a catalyst auxiliary etc.

The active metal serves as a catalyst active component in an oxidation catalyst. Active metals include noble metals and base metals, with noble metals being preferred. Specific examples of noble metals include platinum (Pt), palladium (Pd), rhodium (Rh), ruthenium (Ru), iridium (Ir), osmium (Os), gold (Au) and silver (Ag), with platinum, palladium or gold more preferably being used.

Furthermore, one of these noble metals may be used or a mixture of two or more may be used, and according to a preferred mode of the invention of this application, a mixture of platinum and palladium or a mixture of platinum, palladium and gold is more preferred.

Specific examples of base metals which may be mentioned include copper (Cu), iron (Fe), cobalt (Co), zinc (Zn), potassium (K), cesium (Cs), silver (Ag), so-called oxygen storage materials comprising a rare-earth metal and perovskite compounds comprising Fe, Mn, Y, Ce and La etc. Among these, alkali metals, oxygen storage materials and iron are more preferred. Furthermore, one of these base metals may be used or a mixture of two or more may be used.

In the filter according to this mode of embodiment, the void occupancy of the catalytic substance occupying the pores in the plurality of porous partition walls is preferably 10% or less. By virtue of this configuration, it is possible to achieve a balance between reducing pressure loss and carbon material trapping efficiency. More preferably, 5% or less of the catalytic substance is present within the pores of the partition walls.

As a result of the catalytic substance being present within the pores of the partition walls 5 at a void occupancy of 10% or less, it is possible to restrict resistance to the passage of gas flowing inside the cells 4 while it is also possible to achieve a balance with maintaining the trapping capacity of the PM component.

The form of the pores and the void occupancy of the catalytic substance may be obtained using a scanning electron microscope (SEM)/electron probe micro-analyzer (EPMA). For example, by means of SEM/EPMA, it is possible to obtain the pore area (A) of the base material before application of the catalytic substance in a field of view of between 150 times and 500 times by means of image processing (illustrated in FIG. 2). Furthermore, the pore area (B) after application of the catalyst can also be obtained by the same method. Furthermore, the area of the base material portion is obtained by means of image processing using the same two-dimensional method, whereby the relative proportion of the pore area of the base material 1 and the area occupancy can be calculated.

Furthermore, a mercury intrusion method is generally used as a method for three-dimensional pore structure volume measurement, and the correlation between that method and the abovementioned image method affords results such as illustrated in FIG. 3; there is a correlation between the two-dimensional void occupancy (proportion of occupied area) obtained from an SEM image, and the void occupancy volume obtained from mercury porosimeter measurement results constituting three-dimensional information.

Here, according to the SEM image method, an EPM method with a magnification of 150-200 times is preferably used, e.g., it is possible to obtain the occupied area by separating the base material and the area occupied by the catalyst according to color using an RGB method.

In the filter according to this mode of embodiment, when the occupied area is obtained by image processing, the image is binarized and the calculation is made using an automatic mode or the like in order to prevent human error.

In the filter according to this mode of embodiment, the mean particle size D50 of the catalytic substance is preferably $1/10$ or less of the mean pore size D50 of the pores in the partition walls 5.

The mean particle size D50 of the catalytic substance may be specifically measured by laser diffraction or the like. The mean pore size D50 of the partition walls 5 may be measured specifically by mercury porosimetry. For example, if the mean pore size D50 of the pores in the partition walls 5 is 10 μm, then the mean particle size D50 of the catalytic substance is preferably 0.5 μm or less.

Here, the "mean particle size D50" means the size of particles (median size) corresponding to a median value (50%) in the grain size distribution of the particles.

The mean pore size D50 of the pores in the partition walls 5 is preferably between 8 μm and 20 μm, and 10 μm or greater is more preferable from the point of view that there is a high initial level of trapping efficiency with respect to carbon materials. The mean particle size D50 of the catalytic substance is preferably $1/10$ or less of the mean pore size of the partition walls, but a mean particle size of 20 nm or greater is preferred for reasons of stability etc. of the dispersed state of solid material in a catalyst slurry.

Furthermore, if particles larger than this are used, it tends to be difficult for the catalytic substance to reach the pores in the walls, and if the catalytic substance is deposited on the walls on the catalyst slurry supply-side in particular (on-wall), this is likely to cause a reduction in PM trapping efficiency and trapping capacity.

In the filter according to this mode of embodiment, the amount of catalytic substance may have a gradient in the lengthwise direction of the base material, and the void occupancy of the catalyst is preferably 10% or less. By virtue of this configuration, it is possible to increase the efficiency contributed by the catalyst in terms of exhaust gas purification.

The amount of catalytic substance, expressed another way, means the concentration of active metal such as Pt or Pd acting as a catalyst. That is to say, the concentration of active metal may have a gradient in the lengthwise direction of the base material and the concentration ratio of active metal at the gas inflow-side end portion and outflow-side end portion may be between 10/90 and 90/10.

If the inflow side is at a high concentration, this makes it possible for the noble metal on the filter to contribute to exhaust gas purification, while it is effective for the outflow side to be at a high concentration if $NO_2$ or the like is to be supplied downstream, for example.

If the filter according to this mode of embodiment has the base material configuration described above, it is possible to restrict a reduction in PM trapping efficiency and efficiency of the treatment afforded by the catalyst in a state in which the catalyst is locally present at the inflow-side end portion 2 and the outflow-side end portion 3.

In the filter according to this mode of embodiment, the catalytic substance is preferably included in a range of between 10% and 50% of the total length of the partition walls in the lengthwise direction, from the gas inflow-side end portion.

By setting the range of application of the catalytic substance at between 10% and 50% of the total length of the partition walls in the lengthwise direction, it is possible to achieve an effect of enabling particularly high NOx purification performance to be achieved. In this case, the range of application of the catalytic substance is preferably started from the gas inflow-side end portion, but the catalytic substance is preferably not provided at the gas outflow side.

In the filter according to this mode of embodiment, Pt and Pd are preferably included in a ratio of between 1:1 and 10:1 as the catalytic substance. By virtue of this configuration, it is possible to achieve an effect enabling suppression of thermal sintering (aggregation) of the noble metal. Pt and Pd are more preferably included in a ratio of between 2:1 and 5:1.

Furthermore, even if only a PM combustion catalyst comprising a transition metal group is used in conjunction with a noble metal, only the PM combustion catalyst comprising a transition metal group may be applied, or the two may be mixed for use.

In the filter according to this mode of embodiment, at least one material selected from the group consisting of oxygen storage materials, alkali metals and perovskite materials is preferably further included as a catalyst auxiliary. By further including this kind of PM combustion catalyst comprising a transition metal group, it is possible to achieve an effect of promoting combustion of carbon materials.

Examples of oxygen storage materials which may be cited include materials comprising Ce, Pr, Zr and Nd. Among these, Ce is particularly preferably used for reasons of promoting combustion.

Examples of alkali metals which may be cited include K, Cs and Mg. Among these, K and Cs are particularly preferably used for reasons of promoting combustion.

Examples of perovskite materials which may be cited include $Bi_4Ti_3O_4$ (JP 2010-69471 A) and $Ce_{0.5}B_{0.1}Pr_{0.4}$ JP 2009-112907 A), among others.

The oxygen storage materials are most preferred among the oxygen storage materials, alkali metals and perovskite materials.

In the filter according to this mode of embodiment, only one of the gas inflow-side end portion and outflow-side end portion is preferably partially closed off. By virtue of this configuration, it is possible to achieve an effect of making the filter less likely to become clogged in actual use.

In the filter according to this mode of embodiment, the porosity of the base material 1 is preferably between 40% and 70%. By virtue of this configuration, it is possible to achieve an effect of a balance between reduced pressure loss and carbon material trapping capacity.

The porosity of the base material 1 is more preferably between 45% and 65% from the point of view of a balance between pressure loss and PM trapping performance.

In the filter according to this mode of embodiment, the void occupancy of the catalytic substance in the pores of the partition walls 5 in accordance with image processing is preferably less than 10%. By virtue of this configuration, it is possible to achieve an effect whereby it is possible to restrict a reduction in PM trapping efficiency and increased pressure loss.

The void occupancy of the catalytic substance in the pores of the partition walls 5 is more preferably less than 5%.

The filter according to this mode of embodiment is used for exhaust gas purification, and a device employing the filter according to this mode of embodiment is preferably used in an exhaust system of an internal combustion engine, in particular a spark-ignition engine (e.g. a gasoline engine) or a compression-ignition engine (e.g. a diesel engine).

Furthermore, these engines may be engines which combust fuel while adjusting the air/fuel ratio, and specific preferred examples thereof which may be cited include lean-burn engines and direct-injection engines, and preferably engines combining same (i.e., direct-injection lean-burn engines). A direct-injection engine employs a fuel supply system which enables an increased compression ratio, an improvement in fuel efficiency and also a reduction in exhaust gas. It is therefore possible to envision a reduction in exhaust gas and an improvement in combustion efficiency by combining a direct-injection engine with a lean-burn engine.

The filter according to this mode of embodiment is preferably used in an exhaust system of an internal combustion engine mounted in a transportation vehicle or machine etc. Specific examples of transportation vehicles and machines which may be cited include: transportation vehicles such as automobiles, buses, trucks, dump trucks, tracked vehicles, motorcycles, moving vehicles equipped with an engine, watercraft, tankers, motorboats, and aircraft; agricultural machines such as cultivators, tractors, combine harvesters, chainsaws, and forestry machines; marine fishery machines such as fishing boats; civil engineering machines such as tanker trucks, cranes, compressors, and excavators; power generators; and similar machines.

When the filter according to this mode of embodiment is installed in a vehicle exhaust system, for example, it may be provided in a start catalyst, an underfloor system or a manifold converter.

EXEMPLARY EMBODIMENTS

Exemplary embodiments in accordance with the present invention will be described below. The content of the present invention should not be construed as being limited by these exemplary embodiments.

Exemplary Embodiment 1

A slurry comprising alumina particles having a mean particle size (D50) of 0.02 μm, 0.5 μm, 2.1 μm or 4.5 μm was coated in an amount of 11 g/L on a diesel particulate filter (DPF) base material (diameter 143.8 mm, length 152.4 mm, after which the materials were dried and baked at 500° C. to produce a catalyzed DPF. The pressure loss (BP) under an air stream of 300 kg/h was measured for said catalyzed DPF.

FIG. 4 is a graph showing the relationship of catalyst particle size (D50) and pressure loss (BP) with respect to a DPF having a mean pore size of 10 μm for the base material. It is clear from this graph that when the mean pore size of the DPF is 10 μm, the mean particle size is preferably approximately 0.5 μm or less.

Exemplary Embodiment 2

Three types of catalyzed soot filters (CSF) in which the amount of catalyst was 11 g/L, 25 g/L and 45 g/L were prepared using alumina particles having a mean particle size of 0.02 μm.

The filling ratio of the pores of the CSFs were obtained by means of an image processing method, and the PM trapping efficiency was measured using a PM generator. The results are shown in FIG. 5. It is clear from the results in FIG. 5 that the PM trapping efficiency decreases as the pore filling ratio increases.

Exemplary Embodiment 3

Pressure loss measurements were carried out using the CSFs prepared in Exemplary Embodiment 2. The results are shown in FIG. 6. It is clear from results in FIG. 6 that the pressure loss increases as the as the pore filling ratio increases. The catalyst is therefore preferably present from the point of view of PM combustion, but it is clear that the filling ratio of the filter base material is preferably lower, based on the results of Exemplary Embodiments 2 and 3.

Exemplary Embodiment 4

FIG. 7 is a graph showing the relationship of Pt/Pd ratio and combustion temperature. The graph in FIG. 7 shows cases of Pt/Pd=1/0, 3/1, 2/1 and 1/1. It is clear from the results in FIG. 7 that the Pd ratio is preferably higher in order to cause the PFF to contribute to emission reduction, and it is clear that the proportion of Pt is preferably higher in order to cause the PFF to contribute to PM combustion.

The invention claimed is:

1. A filter comprising a base material and a catalytic substance provided within the base material,
wherein the base material comprises a plurality of cells forming gas flow paths and having a gas inflow-side end portion and outflow-side end portion, the base material has a length wherein the length is the distance from the gas inflow-side end portion and outflow-side end portion, and a plurality of porous partition walls defining said cells, the end portions of some of the cells being closed off, wherein only one of the gas inflow-side end portion and outflow-side end portion is partially closed off, the catalytic substance is present on the gas inflow portion of the base material, and the void occupancy of the catalytic substance within the pores of the partition walls is 10% or less.

2. The filter as claimed in claim 1, wherein the catalytic substance has a mean particle size D50 of 1/10 or less of the mean pore size D50 of the pores in the partition walls.

3. The filter as claimed in claim 1, wherein the catalytic substance comprises noble metals and the concentration ratio of noble metals contained in the catalytic substance at the gas inflow-side end portion and outflow-side end portion is between 10/90 and 90/10.

4. The filter as claimed in claim 1, wherein the catalytic substance is included in a range of between 10% and 50% of the total length of the partition walls in the lengthwise direction, from the gas inflow-side end portion.

5. The filter as claimed in claim 1, comprising Pt and Pd in a ratio of between 1:1 and 10:1 as the catalytic substance.

6. The filter as claimed in claim 1, further comprising at least one material selected from the group consisting of oxygen storage materials, alkali metals and perovskite materials.

7. The filter as claimed in claim 1, wherein the porosity of the base material is between 40% and 70%.

8. The filter as claimed in claim 1, wherein the void occupancy of the catalytic substance is less than 5%.

9. The filter as claimed in claim 1, wherein the amount of catalytic substance is present as a gradient in the lengthwise direction of the filter.

* * * * *